(12) United States Patent
Tanaka

(10) Patent No.: US 11,863,022 B2
(45) Date of Patent: Jan. 2, 2024

(54) MOTOR

(71) Applicant: NIDEC CORPORATION, Kyoto (JP)

(72) Inventor: Junya Tanaka, Kyoto (JP)

(73) Assignee: NIDEC CORPORATION, Kyoto (JP)

( * ) Notice: Subject to any disclaimer, the term of this patent is extended or adjusted under 35 U.S.C. 154(b) by 173 days.

(21) Appl. No.: 17/442,621

(22) PCT Filed: Jan. 10, 2020

(86) PCT No.: PCT/JP2020/000562
§ 371 (c)(1),
(2) Date: Sep. 24, 2021

(87) PCT Pub. No.: WO2020/195003
PCT Pub. Date: Oct. 1, 2020

(65) Prior Publication Data
US 2022/0173628 A1 Jun. 2, 2022

(30) Foreign Application Priority Data

Mar. 25, 2019 (JP) ................................. 2019-057285

(51) Int. Cl.
*H02K 1/27* (2022.01)
*H02K 1/2783* (2022.01)
(Continued)

(52) U.S. Cl.
CPC ......... *H02K 1/2783* (2022.01); *H02K 11/215* (2016.01); *H02K 21/16* (2013.01)

(58) Field of Classification Search
CPC ...... H02K 1/27; H02K 1/2706; H02K 1/2793; H02K 11/21; H02K 11/215; H02K 29/08
See application file for complete search history.

(56) References Cited

U.S. PATENT DOCUMENTS 7,462,968 B2   12/2008  Kusase et al.
8,400,038 B2 *  3/2013  Smith ................ H02K 1/2766
                                              310/156.43
(Continued)

FOREIGN PATENT DOCUMENTS

JP   S60-137374 U   9/1985
JP   201098891 A    4/2010
(Continued)

OTHER PUBLICATIONS

Machine Translation of WO-2017168751-A1 (Year: 2017).*
(Continued)

*Primary Examiner* — Quyen P Leung
*Assistant Examiner* — Masoud Vaziri
(74) *Attorney, Agent, or Firm* — HAUPTMAN HAM, LLP

(57) ABSTRACT

A motor includes a rotor magnet, a stator, and a magnetic sensor. The rotor magnet includes magnetized portions in a Halbach array, and having radially magnetized portions whose magnetization direction is a radial direction and non-radially magnetized portions. In first and second radially magnetized portions, magnetic poles on both sides in the radial direction are arranged opposite to magnetic poles on both sides in the radial direction of the first radially magnetized portion. The first and second radially magnetized portions are alternately arranged along a circumferential direction with at least one non-radially magnetized portion therebetween. The magnetic sensor is located on the other side in the radial direction with respect to the rotor magnet. A non-magnetized portion is in an axial portion of the rotor magnet where a magnetic field is detected by the magnetic sensor, and located between the first and second radially magnetized portions in the circumferential direction.

15 Claims, 5 Drawing Sheets

(51) Int. Cl.
*H02K 11/215* (2016.01)
*H02K 21/16* (2006.01)

(56) References Cited

U.S. PATENT DOCUMENTS

| | | | | |
|---|---|---|---|---|
| 9,059,627 | B2* | 6/2015 | Englert | H02K 49/106 |
| 2006/0138879 | A1* | 6/2006 | Kusase | H02K 21/22 |
| | | | | 310/156.43 |
| 2008/0224557 | A1* | 9/2008 | Cleveland | B62J 6/20 |
| | | | | 310/156.43 |
| 2014/0030122 | A1* | 1/2014 | Ozaki | H02K 5/225 |
| | | | | 310/71 |
| 2015/0001980 | A1* | 1/2015 | Zhang | H02K 21/16 |
| | | | | 310/156.43 |
| 2015/0348690 | A1* | 12/2015 | Fullerton | H01F 7/0221 |
| | | | | 335/295 |
| 2015/0357870 | A1* | 12/2015 | Hazeyama | H02K 1/2766 |
| | | | | 310/156.07 |
| 2018/0269729 | A1* | 9/2018 | Takemoto | H02K 15/03 |
| 2018/0342917 | A1* | 11/2018 | Hunter | H02K 1/278 |

FOREIGN PATENT DOCUMENTS

| | | | | |
|---|---|---|---|---|
| JP | 201864371 | A | 4/2018 | |
| JP | 6349506 | B2 | 7/2018 | |
| JP | 201922393 | A | 2/2019 | |
| WO | WO-2017042273 | A1 * | 3/2017 | H01F 6/006 |
| WO | WO-2017168751 | A1 * | 10/2017 | F24F 11/89 |

OTHER PUBLICATIONS

Machine Translation of WO-2017042273-A1 (Year: 2017).*
JP-2019022393-A—Machine Translation (Year: 2019).*
International Search Report in PCT/JP2020/000562, dated Mar. 10, 2020. 4pp.

* cited by examiner

MOTOR

CROSS-REFERENCE TO RELATED APPLICATIONS

This is the U.S. national stage of application No. PCT/JP2020/000562, filed on Jan. 10, 2020, and priority under 35 U.S.C. § 119(a) and 35 U.S.C. § 365(b) is claimed from Japanese Patent Application No. 2019-057285, filed on Mar. 25, 2019.

FIELD OF THE INVENTION

The present invention relates to a motor.

BACKGROUND

There is known a motor in which a permanent magnet fixed to a rotor core has a Halbach array. For example, a conventional permanent magnet includes an N-pole magnet in which a magnetic pole on a radially outer side is an N pole, an S-pole magnet in which a magnetic pole on a radially outer side is an S pole, and an auxiliary magnet located between the N-pole magnet and the S-pole magnet and magnetized in a mode of having a magnetization direction toward the N-pole magnet from the S-pole magnet, and forms a Halbach array. In a permanent magnet having a Halbach array, the magnetic field intensity on the radially outer side is increased.

In the motor configured as described above, there is a case where a magnetic sensor that detects a magnetic field of the permanent magnet fixed to the rotor core is provided in order to detect the rotation of a rotor. In this case, the magnetic sensor is sometimes arranged on a side opposite to a side where a stator is arranged, with respect to the permanent magnet, that is, on the radially inner side of the permanent magnet in order to avoid interference with a magnetic field generated from a coil or the like. However, in the case where the permanent magnet has the Halbach array, the magnetic field intensity of the permanent magnet is increased on the radially outer side where the stator is arranged, but is decreased on the radially inner side. Therefore, it is difficult for the magnetic sensor to detect the magnetic field of the permanent magnet on the radially inner side of the permanent magnet, and there is a problem that the detection accuracy of the magnetic sensor deteriorates.

SUMMARY

One aspect of a motor of the present invention includes: a rotor that has a rotor core and a rotor magnet fixed to the rotor core and is rotatable about a central axis; a stator located on one side in a radial direction of the rotor; and a magnetic sensor capable of detecting a magnetic field of the rotor magnet. The rotor magnet has a plurality of magnetized portions arranged along a circumferential direction in a Halbach array to increase a magnetic field intensity on the one side in the radial direction. The plurality of magnetized portions include a plurality of radially magnetized portions whose magnetization direction is the radial direction and a plurality of non-radially magnetized portions whose magnetization direction is different from the radial direction. The radially magnetized portions include a first radially magnetized portion and a second radially magnetized portion in which magnetic poles on both sides in the radial direction are arranged opposite to each other with respect to the first radially magnetized portion. The first radially magnetized portion and the second radially magnetized portion are alternately arranged along the circumferential direction with at least one of the non-radially magnetized portions interposed therebetween. The magnetic sensor is located on the other side in the radial direction with respect to the rotor magnet. A non-magnetized portion is provided in an axial portion of the rotor magnet where a magnetic field is detected by the magnetic sensor. The non-magnetized portion is located between the first radially magnetized portion and the second radially magnetized portion in the circumferential direction.

The above and other elements, features, steps, characteristics and advantages of the present disclosure will become more apparent from the following detailed description of the preferred embodiments with reference to the attached drawings.

DETAILED DESCRIPTION

A Z-axis direction appropriately illustrated in each drawing is an up-and-down direction in which a positive side is an "upper side" and a negative side is a "lower side". A central axis J appropriately illustrated in each drawing is a virtual line which is parallel to the Z-axis direction and extends in the up-and-down direction. In the following description, an axial direction of the central axis J, that is, a direction parallel to the up-and-down direction will be simply referred to as the "axial direction", a radial direction having its center on the central axis J will be simply referred to as the "radial direction", and a circumferential direction having its center on the central axis J will be simply referred to as the "circumferential direction".

In addition, a side proceeding counterclockwise in the circumferential direction when viewed from the upper side to the lower side is referred to as "one side in the circumferential direction". A side proceeding clockwise in the circumferential direction when viewed from the upper side to the lower side is referred to as the "other side in the circumferential direction". The one side in the circumferential direction is a side proceeding in a direction of an arrow indicating a rotation angle θ in FIGS. 2 and 3. The other side in the circumferential direction is a side proceeding in a direction opposite to the direction of the arrow indicating the rotation angle θ in FIGS. 2 and 3.

In the embodiment, the lower side corresponds to one side in an axial direction, and the upper side corresponds to the other side in the axial direction. In the present embodiment, the radially outer side corresponds to one side in the radial direction, and the radially inner side corresponds to the other side in the radial direction. Note that the up-and-down direction, the upper side, and the lower side are simply names for describing an arrangement relationship of each portion, and an actual arrangement relationship or the like may be an arrangement relationship other than the arrangement relationship indicated by these names.

Figure 1:
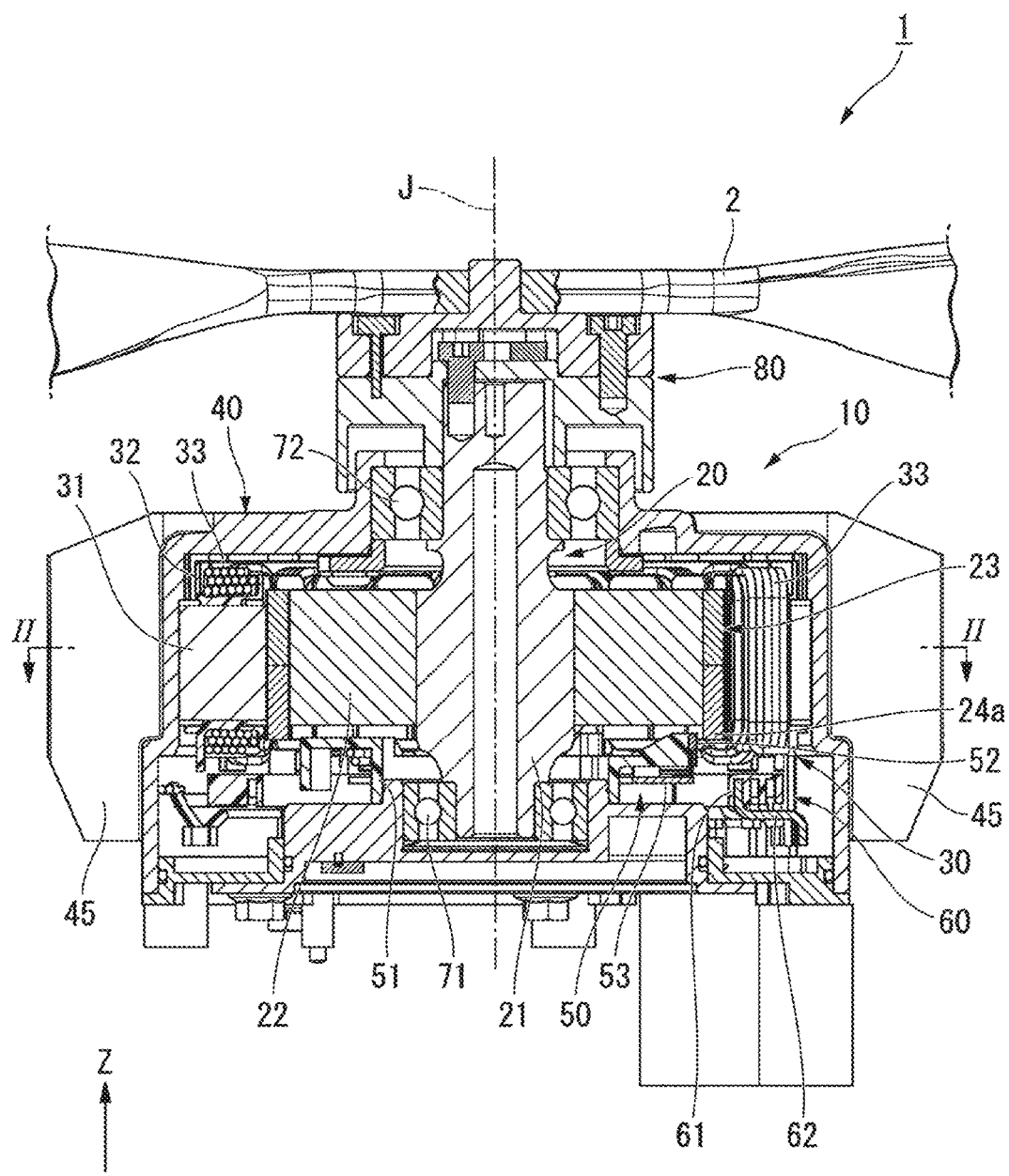
FIG. 1 is a cross-sectional view illustrating a rotor blade device according to the present embodiment.

As illustrated in FIG. 1, a motor 10 of the present embodiment is mounted on a rotor blade device 1. The rotor blade device 1 is mounted on, for example, an unmanned flying object. The rotor blade device 1 includes the motor 10 and a propeller 2.

In the present embodiment, the motor 10 is an inner-rotor motor. The motor 10 includes a housing 40, a stator 30, a busbar assembly 60, a rotor 20, a first bearing 71, a second bearing 72, a propeller mounting portion 80, and a sensor assembly 50.

The rotor 20, the stator 30, the sensor assembly 50, the busbar assembly 60, the first bearing 71, and the second bearing 72 are accommodated in the housing 40. A plurality of fins 45 arranged along the circumferential direction are provided on an outer peripheral surface of the housing 40.

Figure 2:
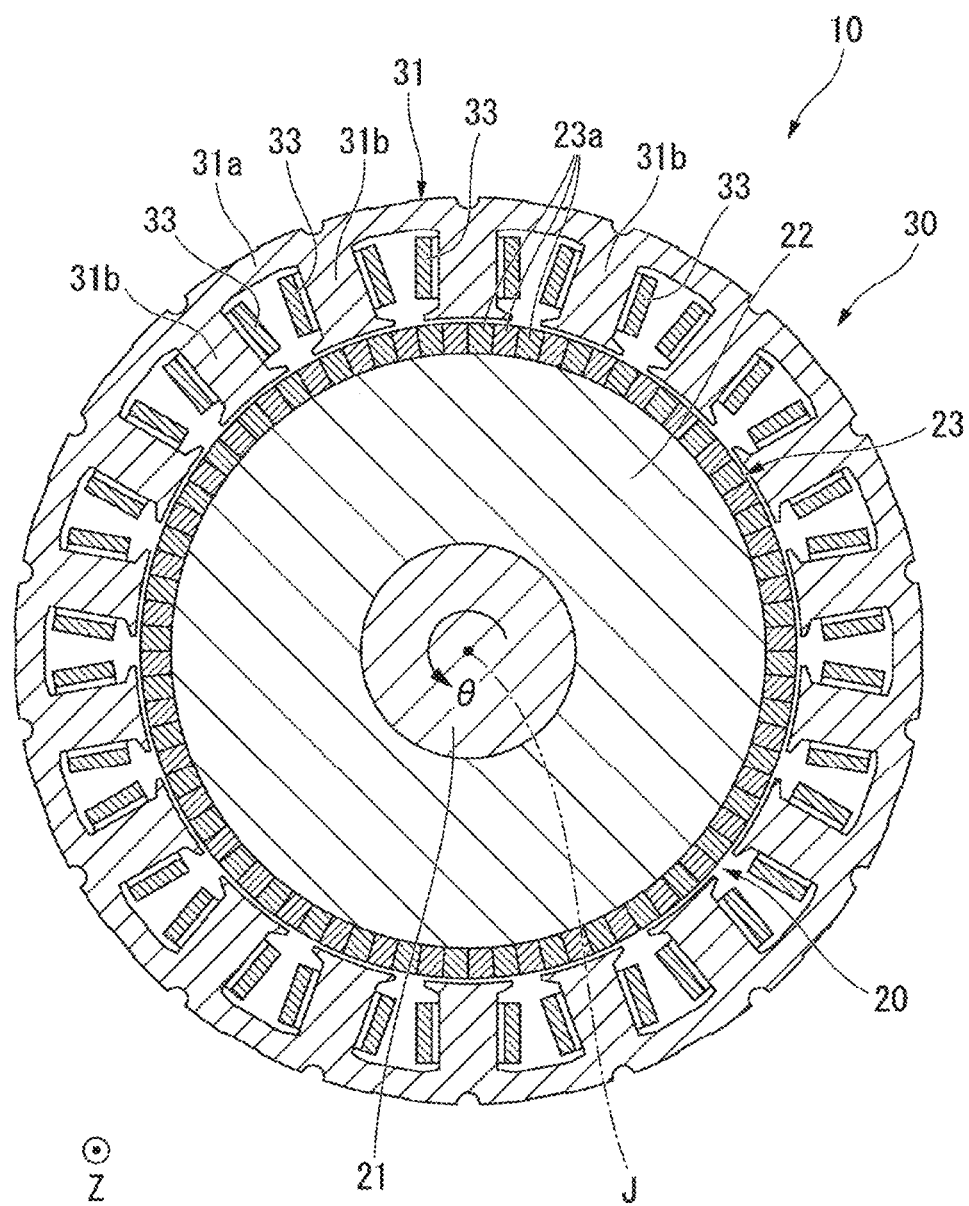
FIG. 2 is a cross-sectional view illustrating a rotor and a stator according to the present embodiment, and is a cross-sectional view taken along line II-II in FIG. 1.
Figure 3:
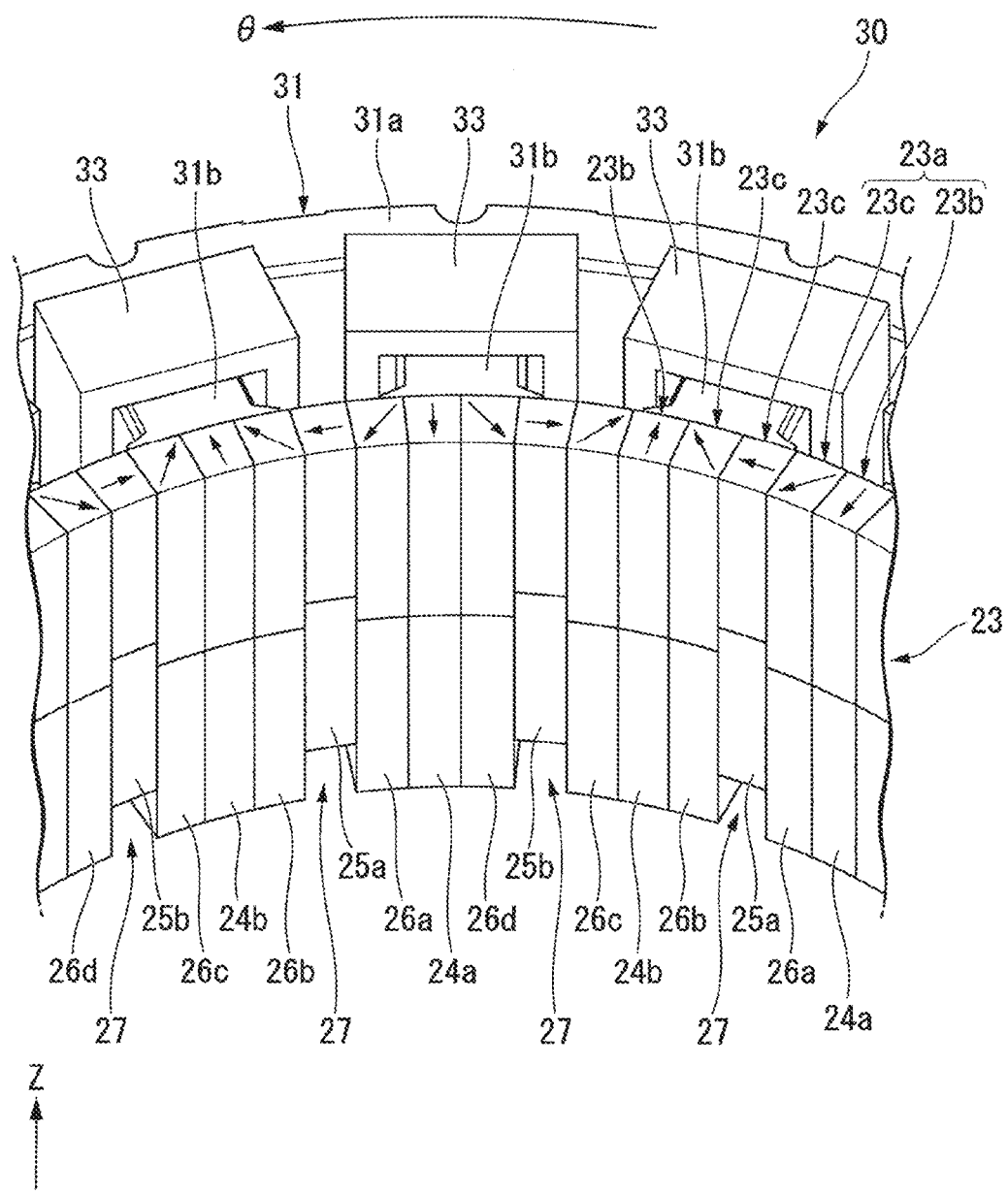
FIG. 3 is a perspective view illustrating a part of a rotor magnet and a part of the stator of the present embodiment.

In the present embodiment, the stator 30 is located on the radially outer side of the rotor 20. The stator 30 includes a stator core 31, an insulator 32, and a plurality of coils 33. As illustrated in FIGS. 2 and 3, the stator core 31 includes a core back 31a and a plurality of teeth 31b. The core back 31a has an annular shape surrounding the central axis J. The core back 31a has, for example, an annular shape centered on the central axis J. The plurality of teeth 31b extend to the radially inner side from the core back 31a. The plurality of teeth 31b are arranged at regular intervals along the circumferential direction over the entire circumference. For example, eighteen teeth 31b are provided.

The plurality of coils 33 are attached to the stator core 31 with the insulator 32 interposed therebetween. More specifically, the plurality of coils 33 are attached to the plurality of teeth 31b via the insulator 32. Note that the insulator 32 is not illustrated in FIGS. 2 and 3.

As illustrated in FIG. 1, the busbar assembly 60 is located below the stator 30. The busbar assembly 60 is located on the radially outer side of the sensor assembly 50. The busbar assembly 60 includes a busbar holder 61 and a busbar 62. The busbar holder 61 holds the busbar 62. The busbar 62 is electrically connected to the coil 33.

The rotor 20 is rotatable about the central axis J. In the present embodiment, the rotor 20 is located on the radially inner side of the stator 30. The rotor 20 includes a shaft 21, a rotor core 22, and a rotor magnet 23. The shaft 21 is arranged along the central axis J. The shaft 21 has a columnar shape that extends in the axial direction with the central axis J as the center. An upper end of the shaft 21 protrudes upward from the housing 40.

The rotor core 22 is fixed to an outer peripheral surface of the shaft 21. The rotor core 22 has an annular shape surrounding the central axis J. In the present embodiment, the rotor core 22 has the annular shape centered on the central axis J.

The rotor magnet 23 is fixed to the rotor core 22. The rotor magnet 23 has a tubular shape surrounding the rotor core 22. The rotor magnet 23 has, for example, a cylindrical shape that extends in the axial direction with the central axis J as the center and is open on both sides in the axial direction. An inner peripheral surface of the rotor magnet 23 is fixed to an outer peripheral surface of the rotor core 22 with, for example, an adhesive or the like. In the present embodiment, a lower end of the rotor magnet 23 is located below a lower end of the rotor core 22 and a lower end of the stator core 31. In the present embodiment, an upper end of the rotor magnet 23 is located at the same position in the axial direction as an upper end of the rotor core 22.

As illustrated in FIGS. 2 and 3, the rotor magnet 23 includes a plurality of magnetized portions 23a. In the present embodiment, the plurality of magnetized portions 23a are magnets that are separate members from each other. The rotor magnet 23 is configured by connecting the plurality of magnetized portions 23a along the circumferential direction. As illustrated in FIG. 3, the plurality of magnetized portions 23a have, for example, a quadrangular prism shape extending in the axial direction. Each of the magnetized portions 23a is configured by, for example, connecting two magnets in the axial direction. A circumferential dimension of the magnetized portion 23a is smaller than a circumferential dimension of the tooth 31b. In the present embodiment, four or five magnetized portions 23a can simultaneously face one tooth 31b in the radial direction. For example, eighty magnetized portions 23a are provided.

The plurality of magnetized portions 23a are arranged along the circumferential direction in a Halbach array for increasing the magnetic field intensity on the radially outer side. The plurality of magnetized portions 23a include a plurality of radially magnetized portions 23b and a plurality of non-radially magnetized portions 23c. The radially magnetized portion 23b is the magnetized portion 23a whose magnetization direction is the radial direction. The non-radially magnetized portion 23c is the magnetized portion 23a whose magnetization direction is different from the radial direction.

Note that the magnetization directions of the magnetized portions 23a are virtually indicated by arrows on upper end surfaces of the magnetized portions 23a in FIG. 3. The direction of the virtually indicated arrow indicates a direction from an S pole to an N pole in the magnetized portion 23a. That is, magnetic poles of the magnetized portion 23a are set such that a side on which the virtually indicated arrow faces is the N pole and a side opposite to the side on which the virtually indicated arrow faces is the S pole. In the following description, the direction of the virtually indicated arrow, that is, the direction from the S pole to the N pole in the magnetized portion 23a is simply referred to as a "direction of a magnetization direction".

The radially magnetized portion 23b includes a first radially magnetized portion 24a and a second radially magnetized portion 24b. A direction of a magnetization direction of the first radially magnetized portion 24a is a radially inward direction. That is, magnetic poles of the first radially magnetized portion 24a are set such that the radially inner side is an N pole and the radially outer side is an S pole. A direction of a magnetization direction of the second radially magnetized portion 24b is a radially outward direction. That is, magnetic poles of the second radially magnetized portion 24b are set such that the radially outer side is an N pole and the radially inner side is an S pole. In the second radially magnetized portion 24b, the magnetic poles on both the sides in the radial direction are arranged opposite to those of the first radially magnetized portion 24a.

The first radially magnetized portions 24a and the second radially magnetized portions 24b are alternately arranged along the circumferential direction with at least one of non-radially magnetized portions 23c interposed therebetween. In the present embodiment, the first radially magnetized portions 24a and the second radially magnetized portions 24b are alternately arranged along the circumferential direction with three non-radially magnetized portion 23c interposed therebetween.

The non-radially magnetized portion 23c includes first non-radially magnetized portions 25a and 25b and second non-radially magnetized portions 26a, 26b, 26c, and 26d.

Magnetization directions of the first non-radially magnetized portions 25a and 25b are the circumferential direction. A direction of the magnetization direction of the first non-radially magnetized portion 25a is a direction toward one side (+θ side) in the circumferential direction. That is, magnetic poles of the first non-radially magnetized portion 25a are set such that the one side in the circumferential direction is an N pole and the other side (−θ side) in the circumferential direction is an S pole. A direction of the magnetization direction of the first non-radially magnetized portion 25b is a direction toward the other side in the circumferential direction. That is, magnetic poles of the first non-radially magnetized portion 25b are set such that the other side in the circumferential direction is an N pole and the one side in the circumferential direction is an S pole. In the first non-radially magnetized portion 25b, the magnetic poles on both the sides in the circumferential direction are arranged opposite to those of the first non-radially magnetized portion 25a.

Each of the first non-radially magnetized portions 25a and 25b is located between the first radially magnetized portion 24a and the second radially magnetized portion 24b in the circumferential direction. The first non-radially magnetized portions 25a and the first non-radially magnetized portions 25b are alternately arranged along the circumferential direction with any one of the first radially magnetized portion 24a and the second radially magnetized portion 24b interposed therebetween. The first non-radially magnetized portion 25a is located on one side (+θ side) in the circumferential direction of the first radially magnetized portion 24a and is located on the other side (−θ side) in the circumferential direction of the second radially magnetized portion 24b between the first radially magnetized portion 24a and the second radially magnetized portion 24b in the circumferential direction. The first non-radially magnetized portion 25b is located on the other side in the circumferential direction of the first radially magnetized portion 24a and is located on the one side in the circumferential direction of the second radially magnetized portion 24b between the first radially magnetized portion 24a and the second radially magnetized portion 24b in the circumferential direction.

The N poles of the first non-radially magnetized portions 25a and 25b are arranged on a side where the second radially magnetized portion 24b is located, between the first radially magnetized portion 24a and the second radially magnetized portion 24b in the circumferential direction. The S poles of the first non-radially magnetized portions 25a and 25b are arranged on a side where the first radially magnetized portion 24a is located, between the first radially magnetized portion 24a and the second radially magnetized portion 24b in the circumferential direction.

Magnetization directions of the second non-radially magnetized portions 26a, 26b, 26c, and 26d are directions intersecting both the radial direction and the circumferential direction. The magnetization directions of the second non-radially magnetized portions 26a, 26b, 26c, and 26d are orthogonal to the axial direction. In the present embodiment, the magnetization directions of the second non-radially magnetized portions 26a, 26b, 26c, and 26d are directions inclined by 45° in the circumferential direction with respect to the radial direction. The magnetization directions of the second non-radially magnetized portions 26a and 26c are directions located on one side (+θ side) in the circumferential direction as proceeding to the radially inner side. The magnetization directions of the second non-radially magnetized portions 26b and 26d are directions located on the other side (−θ side) in the circumferential direction as proceeding to the radially inner side.

In the present embodiment, directions of the magnetization directions of the second non-radially magnetized portions 26a, 26b, 26c, and 26d are directions each of which is inclined by 45° toward the direction of the magnetization direction of the magnetized portion 23a adjacent on the other side (−θ side) in the circumferential direction with respect to the direction of the magnetization direction of the magnetized portion 23a adjacent on one side (+θ side) in the circumferential direction.

The direction of the magnetization direction of the second non-radially magnetized portion 26a is a direction toward one side (+θ side) in the circumferential direction that is inclined radially inward. That is, the second non-radially magnetized portion 26a has an N pole on the radially inner side and the one side in the circumferential direction and an S pole on the radially outer side and the other side (−θ side) in the circumferential direction. The direction of the magnetization direction of the second non-radially magnetized portion 26b is a direction toward one side in the circumferential direction that is inclined radially outward. That is, the second non-radially magnetized portion 26b has an N pole on the radially outer side and the one side in the circumferential direction and an S pole on the radially inner side and the other side in the circumferential direction. The direction of the magnetization direction of the second non-radially magnetized portion 26c is a direction toward the other side in the circumferential direction that is inclined radially outward. That is, the second non-radially magnetized portion 26c has an N pole on the radially outer side and the other side in the circumferential direction and an S pole on the radially inner side and the one side in the circumferential direction. The direction of the magnetization direction of the second non-radially magnetized portion 26d is a direction toward the other side in the circumferential direction that is inclined radially inward. That is, the second non-radially magnetized portion 26d has an N pole on the radially inner side and the other side in the circumferential direction and an S pole on the radially outer side and the one side in the circumferential direction.

The second non-radially magnetized portions 26a and 26b are arranged adjacent to each other on both the sides in the circumferential direction of the first non-radially magnetized portion 25a. The second non-radially magnetized portions 26c and 26d are arranged adjacent to each other on both the sides in the circumferential direction of the first non-radially magnetized portion 25b. The second non-radially magnetized portions 26a and 26d are arranged adjacent to each other on both the sides in the circumferential direction of the first radially magnetized portion 24a. The second non-radially magnetized portions 26b and 26c are arranged adjacent to each other on both the sides in the circumferential direction of the second radially magnetized portion 24b.

The second non-radially magnetized portion 26a is located between the first radially magnetized portion 24a and the first non-radially magnetized portion 25a in the circumferential direction. The second non-radially magnetized portion 26b is located between the second radially magnetized portion 24b and the first non-radially magnetized portion 25a in the circumferential direction. The second non-radially magnetized portion 26c is located between the second radially magnetized portion 24b and the first non-radially magnetized portion 25b in the circumferential direction. The second non-radially magnetized portion 26d is located between the first radially magnetized portion 24a and the first non-radially magnetized portion 25b in the circumferential direction. In this manner, each of the second non-radially magnetized portions 26a, 26b, 26c, and 26d is located between the radially magnetized portion 23b and each of the first non-radially magnetized portions 25a and 25b in the circumferential direction.

In the rotor magnet 23, a plurality of array patterns in which the plurality of magnetized portions 23a are arrayed along the circumferential direction are continuously formed over the entire circumference. The array patterns of the magnetized portions 23a forming the rotor magnet 23 are array patterns in which the first radially magnetized portions 24a, the second non-radially magnetized portion 26a, the first non-radially magnetized portion 25a, the second non-radially magnetized portion 26b, the second radially magnetized portion 24b, the second non-radially magnetized portion 26c, the first non-radially magnetized portion 25b, and the second non-radially magnetized portions 26d are arrayed in this order toward the one side in the circumferential direction. As a result, the rotor magnet 23 has the Halbach array in which the magnetic field intensity on the radially outer side is increased. Therefore, the magnetic force generated between the rotor 20 and the stator 30 can be increased, and the output of the motor 10 can be improved.

In the present embodiment, an axial dimension of the radially magnetized portion 23b and an axial dimension of each of the second non-radially magnetized portions 26a, 26b, 26c, and 26d are the same. An axial dimension of each of the first non-radially magnetized portions 25a and 25b is smaller than the axial dimension of the radially magnetized portion 23b and the axial dimension of each of the second non-radially magnetized portions 26a, 26b, 26c, and 26d.

Upper ends of the second non-radially magnetized portions 26a, 26b, 26c, and 26d are located at the same position in the axial direction as an upper end of the radially magnetized portion 23b. Lower ends of the second non-radially magnetized portions 26a, 26b, 26c, and 26d are located at the same position in the axial direction as a lower end of the radially magnetized portion 23b. Upper ends of the first non-radially magnetized portions 25a and 25b are located at the same position in the axial direction as the upper end of the radially magnetized portion 23b and the upper ends of the second non-radially magnetized portions 26a, 26b, 26c, and 26d.

Lower ends of the first non-radially magnetized portions 25a and 25b are located above the lower end of the radially magnetized portion 23b and the lower ends of the second non-radially magnetized portions 26a, 26b, 26c, and 26d. Therefore, void portions 27 are provided below the first non-radially magnetized portions 25a and 25b, respectively.

Figure 4:
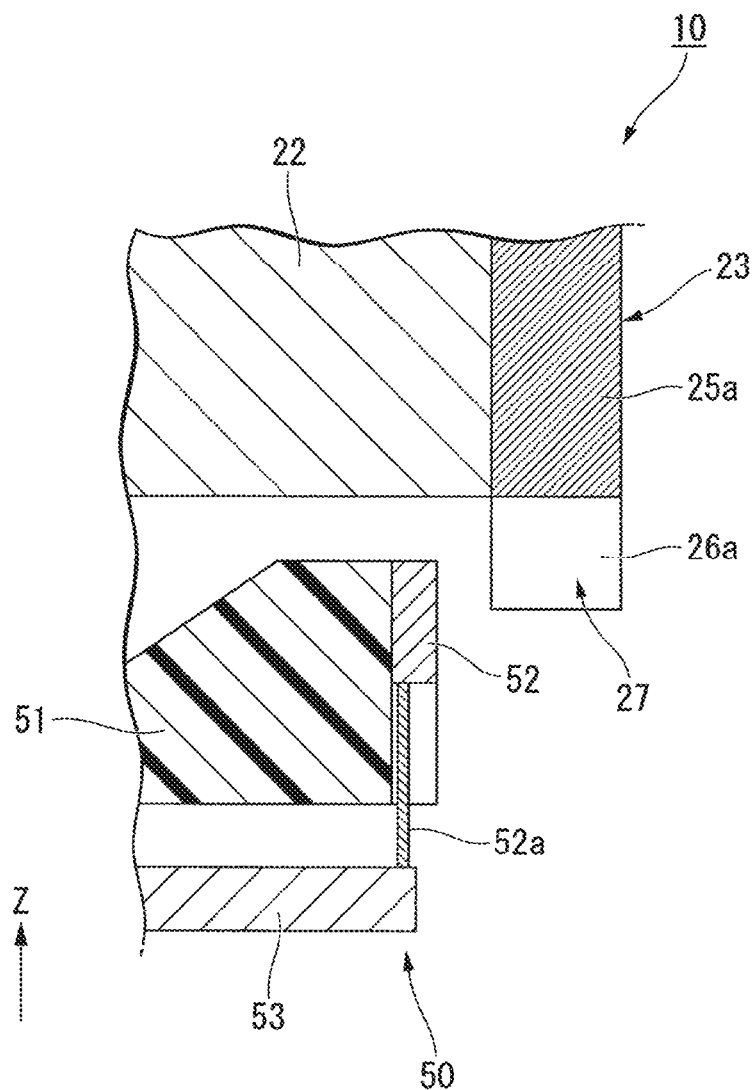
FIG. 4 is a cross-sectional view illustrating a part of a motor according to the present embodiment.

In the present embodiment, the void portion 27 is provided at a lower end of the rotor magnet 23. As illustrated in FIG. 4, an upper end of the void portion 27, that is, the lower ends of the first non-radially magnetized portions 25a and 25b are located at the same position in the axial direction as a lower end of the rotor core 22, for example. Since the void portion 27 is provided, the lower end of the rotor magnet 23 is constituted by the lower end of the first radially magnetized portion 24a, the lower end of the second radially magnetized portion 24b, and the lower ends of the second non-radially magnetized portions 26a, 26b, 26c, and 26d in the present embodiment.

As illustrated in FIG. 3, the plurality of void portions 27 are arranged at equal intervals over the entire circumference along the circumferential direction. Each of the void portions 27 is located between the first radially magnetized portion 24a and the second radially magnetized portion 24b in the circumferential direction. The void portion 27 is a gap between the lower ends of the second non-radially magnetized portions 26a and 26b adjacent to both the sides in the circumferential direction of the first non-radially magnetized portion 25a, or a gap between the lower ends of the second non-radially magnetized portions 26c and 26d adjacent to both the sides in the circumferential of the first non-radially magnetized portion 25b. That is, the lower end of the second non-radially magnetized portion 26a and the lower end of the second non-radially magnetized portion 26b face each other in the circumferential direction with the void portion 27 interposed therebetween. The lower end of the second non-radially magnetized portion 26c and the lower end of the second non-radially magnetized portion 26d face each other in the circumferential direction with the void portion 27 interposed therebetween.

In the present embodiment, the void portion 27 corresponds to a non-magnetized portion. Note that it suffices that the "non-magnetized portion" in the present specification is a portion having no magnetic pole. That is, the non-magnetized portion may be a void portion as in the present embodiment, may be another member that is not magnetized, or may be a portion of the rotor magnet that is not magnetized. When the non-magnetized portion is a member that is not magnetized, the member that is not magnetized may be arranged in a void portion provided as in the present embodiment.

As illustrated in FIG. 1, the first bearing 71 and the second bearing 72 support the rotor 20 rotatably. The first bearing 71 and the second bearing 72 are, for example, ball bearings. The propeller mounting portion 80 is a portion on which the propeller 2 is mounted. The propeller mounting portion 80 is fixed to an upper end of the shaft 21. The propeller mounting portion 80 is located outside the housing 40.

The sensor assembly 50 is located below the rotor core 22. The sensor assembly 50 includes a sensor holder 51, a circuit board 53, and a magnetic sensor 52. That is, the motor 10 includes the sensor holder 51, the circuit board 53, and the magnetic sensor 52.

The circuit board 53 is fixed to the sensor holder 51. The circuit board 53 has a plate shape whose plate surface is directed in the axial direction. The magnetic sensor 52 is located above the circuit board 53. As illustrated in FIG. 4, the magnetic sensor 52 has a terminal 52a extending downward. The terminal 52a is connected to an upper surface of the circuit board 53. As a result, the magnetic sensor 52 is electrically connected to the circuit board 53. The magnetic sensor 52 is held by the sensor holder 51. The magnetic sensor 52 is located below the rotor core 22.

The magnetic sensor 52 is located on the radially inner side of the rotor magnet 23. In the present embodiment, the magnetic sensor 52 is located on the radially inner side of the lower end of the rotor magnet 23. Here, the lower end of the rotor magnet 23 is located below the lower end of the rotor core 22 in the present embodiment. Therefore, the magnetic sensor 52 can be easily arranged on the radially inner side of the lower end of the rotor magnet 23. In the present embodiment, an upper portion of the magnetic sensor 52 is located on the radially inner side of the lower end of the rotor magnet 23. The magnetic sensor 52 faces the lower end of the rotor magnet 23 or the void portion 27 in the radial direction with a gap interposed therebetween.

The magnetic sensor 52 can detect a magnetic field of the rotor magnet 23. In the present embodiment, the magnetic sensor 52 can detect the magnetic field of the lower end of the rotor magnet 23 that faces the magnetic sensor 52 in the radial direction. That is, an axial portion of the rotor magnet 23 where the magnetic field in the present embodiment is detected by the magnetic sensor 52 is the lower end of the rotor magnet 23. In addition, the void portion 27 in the present embodiment is provided in the axial portion of the rotor magnet 23 where the magnetic field is detected by the magnetic sensor 52.

Note that the "portion of the rotor magnet where the magnetic field is detected by the magnetic sensor" in the present specification includes a portion of the rotor magnet whose axial position is the same as an axial position of the magnetic sensor in a case where at least a part of the magnetic sensors is arranged at the same axial position as a part of the rotor magnet. That is, the lower end of the rotor magnet 23 in the present embodiment has the same axial position as the upper portion of the magnetic sensor 52, and is included in the portion where the magnetic field is detected by the magnetic sensor 52.

In addition, the "portion of the rotor magnet where the magnetic field is detected by the magnetic sensor" in the present specification includes an axial end of the rotor magnet on a side close to the magnetic sensor in a case where the magnetic sensor is located above or below the rotor magnet. That is, in a case where the magnetic sensor 52 is located, for example, below the rotor magnet 23, a lower end, close to the magnetic sensor 52 between axial ends of the rotor magnet 23, is included in the portion where the magnetic field is detected by the magnetic sensor 52.

The magnetic sensor 52 in the present embodiment is, for example, a Hall element such as a Hall IC. Although not illustrated, a plurality of the magnetic sensors 52 are provided along the circumferential direction. The rotation of the rotor 20 can be detected by detecting the magnetic field of the rotor magnet 23 with the magnetic sensor 52. The rotation of the rotor 20 may be detected by the magnetic sensor 52 itself, or may be detected by another portion based on a detection result of the magnetic sensor 52. The other portion is, for example, a control unit (not illustrated) provided on the circuit board 53. In this manner, the rotation of the rotor 20 can be detected using the magnetic field of the rotor magnet 23 without separately providing a magnet, configured for detection with the magnetic sensor 52, in addition to the rotor magnet 23 according to the present embodiment. Therefore, the number of components of the motor 10 can be reduced. In addition, it is unnecessary to consider the mounting accuracy of the separately provided magnet, and the assembly of the motor 10 can be facilitated.

In the case where the rotor magnet has the Halbach array in which the magnetic field intensity on the radially outer side is increased as in the rotor magnet 23 of the present embodiment, the magnetic flux hardly flows on the radially inner side of the rotor magnet, and the magnetic field intensity on the radially inner side of the rotor magnet decreases. Therefore, it is difficult for the magnetic sensor to detect the magnetic field of the rotor magnet on the radially inner side of the rotor magnet.

Figure 5:
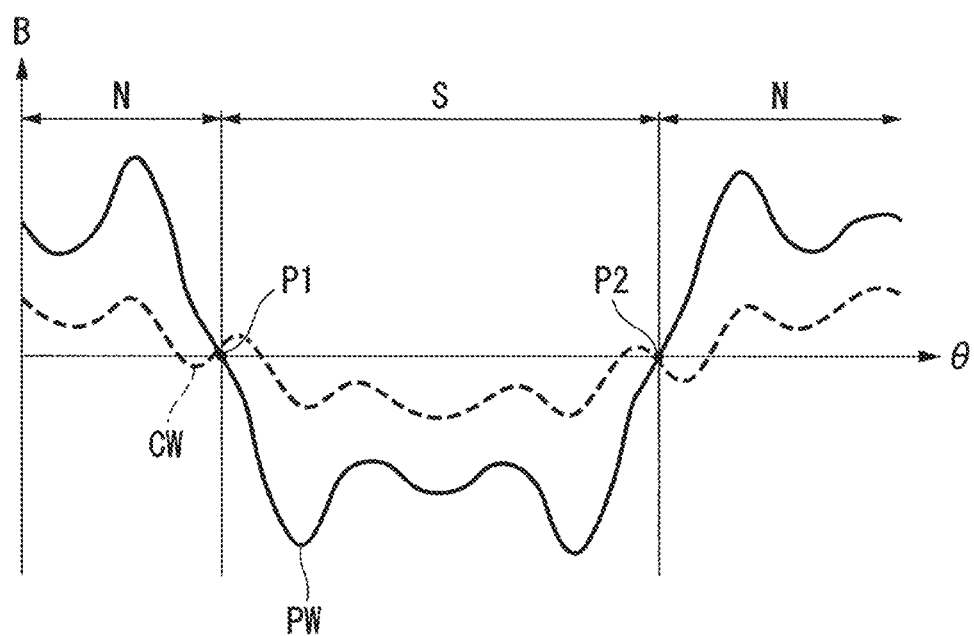
FIG. 5 is a graph illustrating an example of a detection result obtained by a magnetic sensor of the present embodiment.

In addition, in the case where the rotor magnet has the Halbach array in which the magnetic field intensity on the radially outer side is increased, a waveform of a magnetic flux density B detected by the magnetic sensor on the radially inner side of the rotor magnet changes in a cycle in which the magnetic pole of the rotor magnet is switched between the N pole and the S pole and vibrates in a cycle shorter than the switching period of the magnetic pole as indicated by a waveform CW indicated by a broken line in FIG. 5. Therefore, the polarity of the magnetic flux density B is easily reversed before and after points P1 and P2 at which the magnetic pole of the rotor magnet is switched. As a result, it is difficult to accurately detect the points P1 and P2 at which the magnetic pole of the rotor magnet is switched, from the waveform CW of the magnetic flux density B detected by the magnetic sensor, and a circumferential position of the rotor is not accurately detectable in some cases.

In the case where the rotor magnet has the Halbach array in which the magnetic field intensity on the radially outer side is increased as described above, there is a problem that the detection accuracy of the magnetic sensor deteriorates on the radially inner side of the rotor magnet.

Note that, in FIG. 5, the horizontal axis represents the rotation angle $\theta$ of the rotor, and the vertical axis represents the magnetic flux density B detected by the magnetic sensor on the radially inner side of the rotor magnet. In addition, in FIG. 5, for example, it is assumed that the magnetic pole on the radially inner side of the rotor magnet facing the magnetic sensor is the N pole when the magnetic flux density B is a positive value, and the magnetic pole on the radially inner side of the rotor magnet facing the magnetic sensor is the S pole when the magnetic flux density B is a negative value.

In addition, a waveform PW indicated by a solid line in FIG. 5 is an example of the waveform of the magnetic flux density B when the magnetic field of the rotor magnet 23 of the present embodiment is detected by the magnetic sensor 52. The waveform CW indicated by the broken line in FIG. 5 is an example of the waveform of the magnetic flux density B when a magnetic field of a rotor magnet of a comparative embodiment is detected by the magnetic sensor 52. The rotor magnet of the comparative embodiment is similar to the rotor magnet 23 of the present embodiment except that the void portion 27 is not provided.

In view of the above problem, the void portion 27 as the non-magnetized portion, located between the first radially magnetized portion 24a and the second radially magnetized portion 24b in the circumferential direction, is provided in the axial portion of the rotor magnet 23 where the magnetic field is detected by the magnetic sensor 52 according to the present embodiment. Since the void portion 27 is the non-magnetized portion having no magnetic pole, the magnetic flux of the rotor magnet 23 easily flows radially inward in the void portion 27. As a result, the amount of magnetic flux passing through the magnetic sensor 52 located on the radially inner side of the rotor magnet 23 can be increased, and a value of the magnetic flux density B detected by the magnetic sensor 52 can be increased. Therefore, the magnetic field of the rotor magnet 23 can be easily detected by the magnetic sensor 52.

In addition, in a change in the magnetic flux density B, a vibration in a cycle shorter than a cycle in which the magnetic pole is switched can be suppressed as compared with the waveform CW of the comparative embodiment as indicated by the waveform PW indicated by the solid line in FIG. 5. In particular, the non-magnetized portion is located between the first radially magnetized portion 24a and the second radially magnetized portion 24b in the circumferential direction in which the magnetization direction is the radial direction and the magnetic poles are arranged opposite to each other. Therefore, it is possible to particularly cause the magnetic flux to easily flow radially inward between a portion where the magnetic pole on the radially inner side of the rotor magnet 23 becomes the N pole and a portion where the magnetic pole becomes the S pole in the circumferential direction, and it is particularly easy to suppress the vibration having the cycle shorter than the cycle in which the magnetic pole is switched. As a result, it is possible to suppress the occurrence of the polarity inversion of the magnetic flux density B before and after the points P1 and P2 at which the magnetic pole of the rotor magnet 23 is switched. Therefore, it is easy to accurately detect the points P1 and P2 at which the magnetic pole of the rotor magnet 23 is switched, from the waveform PW of the magnetic flux density B detected by the magnetic sensor 52, and the detection accuracy of the circumferential position of the rotor 20 can be improved.

As described above, even when the rotor magnet 23 has the Halbach array to increase the magnetic field intensity on the radially outer side, it is possible to suppress the decrease in detection accuracy of the magnetic sensor 52 on the radially inner side of the rotor magnet 23 by providing the non-magnetized portion in the axial portion of the rotor magnet 23 in which the magnetic field is detected by the magnetic sensor 52. Therefore, it is possible to improve the detection accuracy of a rotational position of the rotor 20 while improving the output of the motor 10 by forming the rotor magnet 23 in the Halbach array according to the present embodiment.

Note that the points P1 and P2 at which the magnetic pole of the rotor magnet 23 is switched in the present embodiment are, for example, the rotation angle θ of the rotor 20 when the void portion 27 faces the magnetic sensor 52 in the radial direction.

In addition, according to the present embodiment, the axial portion of the rotor magnet 23 where the magnetic field is detected by the magnetic sensor 52 is the lower end of the rotor magnet 23, and the void portion 27, which is the non-magnetized portion, is provided at the lower end of the rotor magnet 23. Therefore, it is easy to arrange the magnetic sensor 52 so as to face the rotor magnet 23 as compared with a case where the axial portion of the rotor magnet 23 where the magnetic field is detected by the magnetic sensor 52 is a central portion in the axial direction. As a result, the magnetic field of the rotor magnet 23 can be suitably detected by the magnetic sensor 52 while suppressing complexity of a structure of the motor 10. In addition, it is possible to suppress a decrease in the amount of magnetic flux flowing between the rotor 20 and the stator 30 as compared with a case where the non-magnetized portion is provided at the central portion in the axial direction of the rotor magnet 23 or the like. Therefore, it is possible to suppress a decrease in the output of the motor 10.

In addition, the non-magnetized portions are the void portions 27 provided below the first non-radially magnetized portions 25a and 25b according to the present embodiment. Therefore, for example, the non-magnetized portion can be easily provided by partially shortening the axial dimension of the magnetized portion 23a forming the rotor magnet 23 as in the present embodiment. Therefore, the motor 10 can be easily manufactured.

In addition, the axial dimensions of the first non-radially magnetized portions 25a and 25b are smaller than the axial dimension of the radially magnetized portion 23b according to the present embodiment. Therefore, it is possible to suppress the upper ends of the first non-radially magnetized portions 25a and 25b from protruding above the radially magnetized portion 23b while providing the void portions 27 below the first non-radially magnetized portions 25a and 25b. As a result, it is possible to suppress an increase in size of the rotor 20 in the axial direction, and to suppress an increase in size of the motor 10 in the axial direction.

In addition, the magnetization directions of the first non-radially magnetized portions 25a and 25b are the circumferential direction according to the present embodiment. Therefore, the first non-radially magnetized portions 25a and 25b guide the magnetic flux, which flows between the first radially magnetized portion 24a and the second radially magnetized portion 24b, in the circumferential direction inside the rotor magnet 23, and can suitably suppress the magnetic flux from leaking radially inward. As a result, the amount of magnetic flux on the radially outer side of the rotor magnet 23 arranged in the Halbach array can be suitably increased by providing the first non-radially magnetized portions 25a and 25b. Accordingly, the output of the motor 10 can be further improved.

Meanwhile, the amount of magnetic flux flowing to the radially inner side of the rotor magnet 23 having the Halbach array is further reduced by providing the first non-radially magnetized portions 25a and 25b. Therefore, it is particularly difficult for the magnetic sensor 52 to detect the magnetic field of the rotor magnet 23 on the radially inner side of the axial portion of the rotor magnet 23 where the first non-radially magnetized portions 25a and 25b are provided, so that the detection accuracy of the magnetic sensor 52 is more likely to decrease.

On the other hand, according to the present embodiment, the lower ends of the first non-radially magnetized portions 25a and 25b whose magnetization direction is the circumferential direction are located above the lower end of the radially magnetized portion 23b, and the void portions 27, which are the non-magnetized portions, are provided below the first non-radially magnetized portions 25a and 25b. Therefore, the first non-radially magnetized portions 25a and 25b are not provided at the lower end of the rotor magnet 23, but the void portion 27 as the non-magnetized portion is provided instead. As a result, the magnetic flux can be suitably made to flow to the radially inner side of the rotor magnet 23 at the lower end of the rotor magnet 23. Therefore, it is possible to further suppress the decrease in detection accuracy of the magnetic sensor 52 on the radially inner side of the rotor magnet 23 by detecting the magnetic field of the lower end of the rotor magnet 23 by the magnetic sensor 52.

In addition, the lower ends of the second non-radially magnetized portions 26a, 26b, 26c, and 26d whose magnetization directions intersect both the radial direction and the circumferential direction are located at the same position in the axial direction as the lower end of the radially magnetized portion 23b according to the present embodiment. Therefore, the axial dimensions of the second non-radially magnetized portions 26a, 26b, 26c, and 26d can be easily increased, and the volume of the entire rotor magnet 23 can be easily increased. Therefore, the magnetic field intensity on the radially outer side of the rotor magnet 23 can be more easily increased, and the output of the motor 10 can be further improved.

In addition, the second non-radially magnetized portions 26a, 26b, 26c, and 26d have less influence on the magnetic field increased by the Halbach array than the first non-radially magnetized portions 25a and 25b whose magnetization direction is the circumferential direction. Therefore, if the first non-radially magnetized portions 25a and 25b are not provided by the void portion 27, it is possible to cause the magnetic flux to sufficiently flow to the radially inner side of the rotor magnet 23 even when the second non-radially magnetized portions 26a, 26b, 26c, and 26d are provided at the lower end of the rotor magnet 23. Therefore, it is possible to maintain the detection accuracy of the magnetic field by the magnetic sensor 52 while further improving the output of the motor 10 by the second non-radially magnetized portions 26a, 26b, 26c, and 26d.

In addition, the magnetic sensor 52 is located on the radially inner side of the lower end of the rotor magnet 23 according to the present embodiment. Therefore, the magnetic field at the lower end of the rotor magnet 23 can be more easily detected by the magnetic sensor 52. Therefore, the detection accuracy of the magnetic sensor 52 can be further improved.

In addition, the lower end of the rotor magnet 23 is located below the lower end of the stator core 31 according to the present embodiment. Therefore, even if the void portion 27 is provided as the non-magnetized portion at the lower end of the rotor magnet 23, it is possible to suppress a decrease in the amount of magnetic flux flowing between the rotor 20 and the stator 30. Therefore, it is possible to suppress the decrease in the output of the motor 10.

The present invention is not limited to the above-described embodiment, and can also employ the following configurations. The Halbach array applied to the rotor magnet is not particularly limited as long as a Halbach array increases the magnetic field intensity on the radially outer side (one side in the radial direction). For example, a Halbach array in which the second non-radially magnetized portions 26a, 26b, 26c, and 26d are not provided may be applied to the Halbach array of the above-described embodiment for the rotor magnet. Magnetized portions adjacent to each other in the circumferential direction may be arranged with a gap therebetween. The magnetized portions are not necessarily separate members. In this case, a rotor magnet may be a single member. A lower end (one side in the axial direction) of the rotor magnet may be located at the same position in the axial direction as a lower end of a rotor core, or may be located at the same position in the axial direction as a lower end of a stator core.

The non-magnetized portion is not particularly limited as long as being provided in the axial portion of the rotor magnet where the magnetic field is detected by the magnetic sensor. In the above-described embodiment, the non-magnetized portion may be void portions provided below the second non-radially magnetized portions 26a, 26b, 26c, and 26d. In this case, the void portions may be provided instead of the void portions 27 provided below the first non-radially magnetized portions 25a and 25b, or may be provided together with the void portions 27. The number of non-magnetized portions is not particularly limited as long as the number is one or more.

An axial dimension of a first non-radially magnetized portion may be the same as an axial dimension of a radially magnetized portion. In this case, a void portion as a non-magnetized portion may be provided below (one side in the axial direction of) the first non-radially magnetized portion by axially shifting the first non-radially magnetized portion with respect to the radially magnetized portion. According to such a configuration, all magnetized portions can have the same shape, and thus, it is easy to manufacture a plurality of magnetized portions.

The position of the magnetic sensor is not particularly limited as long as being located on the other side in the radial direction of the rotor magnet. The magnetic sensor may be entirely arranged at an axial position different from the rotor magnet. For example, the magnetic sensor 52 of the above-described embodiment may be located below the position illustrated in FIG. 4 and located below the rotor magnet 23. The magnetic sensor may be located on the other side in the radial direction of the central portion of the rotor magnet in the axial direction. The number of magnetic sensors is not particularly limited as long as the number is one or more. The magnetic sensor may be a magnetoresistive element.

In the above-described embodiment, the inner-rotor motor 10 is adopted as the configuration in which one side in the radial direction is the radially outer side and the other side in the radial direction is the radially inner side, but the present invention is not limited thereto. It may be configured such that one side in the radial direction is a radially inner side, and the other side in the radial direction is a radially outer side. In this case, an outer-rotor motor can be adopted. An application of the motor according to the present disclosure is not particularly limited. The motor may be installed on a vehicle or the like, for example.

Note that each configuration described in the present specification can be properly combined within a range having no contradiction.

Features of the above-described preferred embodiments and the modifications thereof may be combined appropriately as long as no conflict arises.

While preferred embodiments of the present disclosure have been described above, it is to be understood that variations and modifications will be apparent to those skilled in the art without departing from the scope and spirit of the present disclosure. The scope of the present disclosure, therefore, is to be determined solely by the following claims.

The invention claimed is:

1. A motor comprising:
a rotor that has a rotor core and a rotor magnet fixed to the rotor core and is rotatable about a central axis;
a stator located on a first side in a radial direction of the rotor; and
a magnetic sensor configured to detect a magnetic field of the rotor magnet,
wherein
the rotor magnet has a plurality of magnetized portions arranged along a circumferential direction in a Halbach array to increase a magnetic field intensity on the first side in the radial direction,
the plurality of magnetized portions include:
a plurality of radially magnetized portions whose magnetization direction is the radial direction; and
a plurality of non-radially magnetized portions whose magnetization direction is different from the radial direction,
the plurality of radially magnetized portions include a first radially magnetized portion and a second radially magnetized portion, wherein magnetic poles on both sides in the radial direction of the second radially magnetized portion are arranged opposite to magnetic poles on both sides in the radial direction of the first radially magnetized portion,
the first radially magnetized portion and the second radially magnetized portion are alternately arranged along the circumferential direction with at least one of the plurality of non-radially magnetized portions interposed between the first radially magnetized portion and the second radially magnetized portion,
the magnetic sensor is located on a second side in the radial direction with respect to the rotor magnet,
a non-magnetized portion is provided in an axial portion of the rotor magnet where a magnetic field is detected by the magnetic sensor, and
the non-magnetized portion overlaps the first radially magnetized portion and the second radially magnetized portion in the circumferential direction.

2. The motor according to claim 1, wherein
the axial portion of the rotor magnet where the magnetic field is detected by the magnetic sensor is an end of the rotor magnet on a first side in an axial direction of the rotor, and
the non-magnetized portion is provided at the end of the rotor magnet on the first side in the axial direction.

3. The motor according to claim 2, wherein
the plurality of non-radially magnetized portions include a first non-radially magnetized portion,
an end of the first non-radially magnetized portion on the first side in the axial direction is located on a second side in the axial direction with respect to an end of the plurality of radially magnetized portions on the first side in the axial direction, and
the non-magnetized portion is a void portion provided on the first side in the axial direction of the first non-radially magnetized portion.

4. The motor according to claim 3, wherein
an axial dimension of the first non-radially magnetized portion is smaller than an axial dimension of the plurality of radially magnetized portions.

5. The motor according to claim 3, wherein
a magnetization direction of the first non-radially magnetized portion is the circumferential direction.

6. The motor according to claim 5, wherein
the non-radially magnetized portions include a second non-radially magnetized portion whose magnetization direction intersects both the radial direction and the circumferential direction,
the second non-radially magnetized portion is located between the plurality of radially magnetized portions and the first non-radially magnetized portion in the circumferential direction, and
an end of the second non-radially magnetized portion on the first side in the axial direction overlaps the end of the plurality of radially magnetized portions on the first side in the axial direction in the circumferential direction.

7. The motor according to claim 2, wherein
the magnetic sensor is located on the second side in the radial direction of the end of the rotor magnet on the first side in the axial direction.

8. The motor according to claim 7, wherein
the end of the rotor magnet on the first side in the axial direction is located on the first side in the axial direction with respect to an end of the rotor core on the first side in the axial direction.

9. The motor according to claim 7, wherein
the stator includes:
a stator core; and
a plurality of coils attached to the stator core, and
the end of the rotor magnet on the first side in the axial direction is located on the first side in the axial direction with respect to an end of the stator core on the first side in the axial direction.

10. The motor according to claim 1, wherein
the first side in the radial direction is a radially outer side, and
the second side in the radial direction is a radially inner side.

11. The motor according to claim 1, wherein
the first side in the radial direction is a radially inner side, and
the second side in the radial direction is a radially outer side.

12. The motor according to claim 1, wherein
the non-magnetized portion includes a plurality of non-magnetized portions separated from each other in the circumferential direction.

13. The motor according to claim 12, wherein each of the plurality of non-magnetized portions is a void portion.

14. The motor according to claim 12, wherein the plurality of non-magnetized portions are separated from each other at equal intervals in the circumferential direction.

15. The motor according to claim 1, wherein the non-magnetized portion is a void portion that is open to the first side of the plurality of magnetized portions in the radial direction and open to the second side of the plurality of magnetized portions in the radial direction.

* * * * *